(12) United States Patent
Kim et al.

(10) Patent No.: US 11,056,711 B2
(45) Date of Patent: Jul. 6, 2021

(54) SECONDARY BATTERY AND METHOD OF MANUFACTURING THEREFOR

(71) Applicant: JENAX INC., Busan (KR)

(72) Inventors: Chang Hyeon Kim, Chungcheongnam-do (KR); Lee Hyun Shin, Busan (KR); Eun Jung Shin, Gyeonggi-do (KR)

(73) Assignee: ZENAX INC., Busan (KR)

( * ) Notice: Subject to any disclaimer, the term of this patent is extended or adjusted under 35 U.S.C. 154(b) by 26 days.

(21) Appl. No.: 15/756,164

(22) PCT Filed: Aug. 25, 2016

(86) PCT No.: PCT/KR2016/009465
§ 371 (c)(1),
(2) Date: Feb. 28, 2018

(87) PCT Pub. No.: WO2017/039232
PCT Pub. Date: Mar. 9, 2017

(65) Prior Publication Data
US 2018/0254508 A1    Sep. 6, 2018

(30) Foreign Application Priority Data

Aug. 28, 2015 (KR) .................. 10-2015-0122154

(51) Int. Cl.
*H01M 10/052* (2010.01)
*H01M 10/058* (2010.01)
(Continued)

(52) U.S. Cl.
CPC .......... *H01M 10/052* (2013.01); *H01M 2/02* (2013.01); *H01M 2/0202* (2013.01); *H01M 2/18* (2013.01);
(Continued)

(58) Field of Classification Search
CPC ............. H01M 10/052; H01M 10/058; H01M 10/647; H01M 2/18; H01M 4/04;
(Continued)

(56) References Cited

U.S. PATENT DOCUMENTS

| 6,632,538 B1 * | 10/2003 | Yamazaki | H01M 2/021 |
| | | | 428/213 |
| 2006/0061327 A1 * | 3/2006 | Shen | H01M 10/0436 |
| | | | 320/112 |

(Continued)

FOREIGN PATENT DOCUMENTS

| KR | 10-2009-0037619 | 4/2009 |
| KR | 10-2009-0090035 | 8/2009 |

(Continued)

OTHER PUBLICATIONS

Decision_to_Grant_a_Patent for for JP2018-511060 (Year: 2020).*

(Continued)

*Primary Examiner* — Alexander Usyatinsky
(74) *Attorney, Agent, or Firm* — McLean IP Global; Jason Y. Pahng

(57) ABSTRACT

The present invention relates to a secondary battery having the electrode structure and a method of manufacturing therefor, the electrode structure according to an embodiment of the present invention may comprise an electrode assembly including a cathode layer, an anode layer facing the cathode layer, and a separation film disposed between the cathode layer and the anode layer; an exterior body including a upper exterior layer having an outer sealing part of which at least a portion of or whole edges are adhered so as to accommodate the electrode assembly and an electrolyte therein, and a lower exterior layer; a battery penetration part forming openings from the upper exterior layer to the lower exterior layer; and an inner sealing part in which facing portions of the upper exterior layer and the lower exterior (Continued)

layer of external periphery of the battery penetration part are adhered each other.

16 Claims, 9 Drawing Sheets

(51) Int. Cl.
    *H01M 10/42*     (2006.01)
    *H01M 4/13*     (2010.01)
    *H01M 2/02*     (2006.01)
    *H01M 2/36*     (2006.01)
    *H01M 10/647*     (2014.01)
    *H01M 2/18*     (2006.01)
    *H01M 4/04*     (2006.01)
    *H01M 4/134*     (2010.01)
    *H01M 4/66*     (2006.01)
    *H01M 4/02*     (2006.01)

(52) U.S. Cl.
    CPC ......... *H01M 2/361* (2013.01); *H01M 4/0404* (2013.01); *H01M 4/13* (2013.01); *H01M 4/134* (2013.01); *H01M 4/661* (2013.01); *H01M 10/058* (2013.01); *H01M 10/42* (2013.01); *H01M 10/425* (2013.01); *H01M 10/647* (2015.04); *H01M 2004/027* (2013.01); *H01M 2004/028* (2013.01)

(58) Field of Classification Search
    CPC .......... H01M 4/134; H01M 4/66; H01M 2/02; H01M 2/361; H01M 10/42; H01M 4/661; H01M 4/0404; H01M 10/425; H01M 2/0202; H01M 4/13; H01M 2004/027; H01M 2004/028
    See application file for complete search history.

(56) References Cited

U.S. PATENT DOCUMENTS

| | | | |
|---|---|---|---|
| 2006/0267546 A1* | 11/2006 | Shen | H01M 10/0413 320/107 |
| 2007/0218355 A1* | 9/2007 | Ryu | H01M 2/18 429/152 |
| 2011/0008665 A1* | 1/2011 | Yoon | H01M 10/6562 429/120 |
| 2013/0202960 A1* | 8/2013 | Kim | H01M 4/02 429/209 |
| 2014/0106193 A1* | 4/2014 | Kim | H01M 2/0275 429/94 |
| 2015/0179997 A1* | 6/2015 | Iwai | H01M 2/1653 429/145 |
| 2016/0049687 A1* | 2/2016 | Yang | H01M 4/13 29/623.4 |

FOREIGN PATENT DOCUMENTS

| | | | |
|---|---|---|---|
| KR | 20090090035 | * | 8/2009 |
| KR | 10-2010-0113996 | | 10/2010 |
| KR | 10-2015-0000202 | | 1/2015 |
| KR | 10-2015-0034600 | | 4/2015 |

OTHER PUBLICATIONS

Decision to grant a patent for KR 10-2015-0122154 (Year: 2020).*
International Search Report dated Dec. 19, 2016 for PCT/KR2016/009465.

* cited by examiner

SECONDARY BATTERY AND METHOD OF MANUFACTURING THEREFOR

This application claims the priority of Korean Patent Application No. 10-2015-0122154, filed on Aug. 28, 2015 in the KIPO (Korean Intellectual Property Office), the disclosure of which is incorporated herein entirely by reference. Further, this application is the National Stage application of International Application No. PCT/KR2016/009465, filed Aug. 25, 2016, which designates the United States and was published in Korean. Each of these applications is hereby incorporated by reference in their entirety into the present application.

TECHNICAL FIELD

The present invention relates to a battery technology, and more particularly, relates to a secondary battery and a manufacturing method therefor.

BACKGROUND ART

Recently, in connection with the battery industry, as the semiconductor manufacturing technology and the communication technology has been developed, the industry related to the portable electronic is expanding remarkably is expanding, and accordingly, brisk developments are being proceeded in order to meet a growing need for alternative energy sources due to environment conservation and depletion of resources. As compared with a conventional aqueous-based battery, a lithium primary battery referred to as a typical battery has higher voltage and energy density is also higher. Thus, it is widely applied to the industrial fields in terms of miniaturization and implementation of light weight. Such a lithium primary battery is mainly being used as a main power source for a portable electronic device or a backup power source.

The secondary battery uses an electrode material having excellent reversibility and thus, may be charged/discharged. Such a secondary battery mainly consists of a lithium-based oxide as a cathode active material, and carbon materials as the negative active material. Generally, the secondary battery is classified into an aqueous-based electrolyte battery, and a polymer electrolyte battery depending on the type of electrolyte. A battery using an aqueous-based electrolyte battery is referred as a lithium ion battery, and a battery using uses a polymer electrolyte is referred as a lithium-polymer battery. In addition, the lithium secondary batteries are being manufactured in various shapes, and a cylindrical shape, a quadrangle shape, and a pouch shape are enumerated as the typical shapes of the secondary battery.

In case of the pouch-type lithium secondary battery of the lithium secondary battery, an exterior part of the pouch consists of multi-layers structure including a metal foil layer and a synthetic resin layer covering the metal foil layer. If this material is employed, it is possible to reduce a weight of the pouch-type lithium secondary battery remarkably, as compared with a cylindrical or a quadrangle lithium secondary battery using a metal may. In order to realize a light weight of a lithium secondary battery, research and development has been concentrated on the pouch-type lithium secondary battery.

Typically, the pouch-type lithium secondary battery may be manufactured through a step for forming a bare cell by accommodating the electrode assembly into a lower side of the exterior part including a space for accommodating the electrode assembly, covering and sealing the lower side using an upper surface of the exterior part of the pouch; and a step for forming a pouch core pack by attaching an accessory such as a protective circuit module to the pouch bare cell.

When the pouch-type lithium secondary battery is applied to electronic products, a separate battery housing space is already embedded and thus, it becomes a factor that limits the shape and size of the lithium secondary battery, and the housing space also limits the capacity of the battery itself, or there is a limitation to miniaturize electronic products because of the size of the secondary battery.

DISCLOSURE OF THE INVENTION

Technical Problem

The present invention has been made in diagram of the above problems. Thus, the technological object to be realized by the present invention is to provide a secondary battery having improved stability, which is characterized in that it is possible to diversify the shape and size of the lithium secondary battery by relaxing the constraint of the accommodation space of electronic products, and making the electronic products to be downsized while improving the capacity of the secondary battery itself.

Further, another technological object to be realized by the present invention is to provide a method by which a secondary battery having the above-mentioned advantages may be easily manufactured.

Technical Solution

In order to solve the above-mentioned problems, a battery according to an embodiment of the present invention may include an electrode assembly including a cathode layer and an anode layer facing the cathode layer and a separation film disposed between the anode layer and the cathode layer. The cathode layer, the anode layer, and the separation film include an exterior body having more than one aligned inner penetration parts; an upper exterior layer and a lower exterior layer, and also may include an exterior body having an outer sealing part of which at least a portion of or whole edges are adhered so as to accommodate the electrode assembly and an electrolyte therein and wherein facing portions of the adhered outer sealing part are adhered each other. since the upper exterior layer and the lower exterior layer are aligned in the inner penetration part, they may include a battery penetration part forming openings from the upper exterior layer to the lower exterior layer; and an inner sealing part in which facing portions of the upper exterior layer and the lower exterior layer of external periphery of the battery penetration part is adhered each other.

According to one embodiment of the present invention, at least any one of the cathode layer and the anode layer may include a current collector and an active material layer coated on the current collector layer. According to one embodiment of the present invention, at least any one of the cathode layer or the anode layer may include a current collector including conductive fabrics connected to each other like a non-woven fabric structure and an active material embedded in the current collector.

According to one embodiment of the present invention, the exterior sealing part and the inner sealing part of the upper exterior layer and the lower exterior layer may be adhered each other by a heat fusion. According to one embodiment of the present invention, the width of the opening of the separator among the individual openings defining the inner penetration part may be equal to or smaller than the widths of the openings of the anode layer and the cathode layer.

According to one embodiment of the present invention, the width of the opening of the separator among the individual openings defining the inner penetration part may be equal to or may be larger than the width of the opening of the battery penetration part. According to one embodiment of the present invention, the inner penetration part and the battery penetration part may have the same shape.

According to one embodiment of the present invention, the inner penetration part and the battery penetration part may have different shapes. According to one embodiment of the present invention, at least more than one electronic component may be mounted or laminated on the printed circuit board. In one embodiment, the at least more than one electronic components may be inserted into the battery penetration part or may be protruded through the battery penetration part, so that the battery and the printed circuit board may be assembled.

According to another embodiment of the present invention to solve the other problems, there is provided a method for manufacturing a battery may comprise a step for providing an electrode assembly having an inner penetration part; a step for providing an exterior body including a upper exterior layer having an exterior sealing part of which a part or all of edges are adhered to the upper exterior layer, and a lower exterior layer for accommodating the electrode assembly; and a step for forming a battery penetration part having at least more than one openings on the exterior body, in alignment with the inner penetration part of the electrode assembly. According to one embodiment of the present invention, the step for forming a battery penetration part may form an inner sealing part which is aligned with the inner penetration part by adhering opposite portions of the upper exterior layer and the lower exterior layer each other. According to one embodiment of the present invention, the battery penetration part may be formed by forming openings from the upper exterior layer to the lower exterior layer.

According to one embodiment of the present invention, the exterior sealing part and the inner sealing part of the upper exterior layer and the lower exterior layer may be adhered by a heat fusion. According to one embodiment of the present invention, the battery penetration part may be formed on the inner sealing part by using a punching device. According to one embodiment of the present invention, the step of providing an electrode assembly may form a cathode layer, an anode layer facing the cathode layer, and a separation film. At least more than one inner penetration part may be formed on the cathode layer, the anode layer and the separation film.

According to one embodiment of the present invention, the width of an opening of the separation film among individual openings that defines the inner penetration may be formed to be equal to or smaller than the widths of the openings formed in the cathode layer and the anode layer. According to one embodiment of the present invention, the width of an opening of the separation film among individual openings that defines the inner penetration may be formed to be equal to or larger than the widths of the openings formed in the cathode layer and the anode layer. According to one embodiment of the present invention, an electrolyte may be injected into the exterior body where the electrode assembly is accommodated. According to one embodiment of the present invention, the electrolyte may be injected from an injection hole arranged at an edge of the exterior body.

According to one embodiment of the present invention, the injection hole may be sealed after injecting the electrolyte into the exterior body Advantageous Effects According to an embodiment of the present invention, the inner penetration part TH1 is formed in the electrode assembly 100 consisting of the cathode layer, the anode layer, and the separation film and the battery penetration part TH2 including the inner penetration part TH1 is formed from the exterior body for accommodating the electrode assembly therein. Thus, a battery or a battery cell including the battery penetration part TH2 passing through from the upper to the lower exterior layer exterior layer may be provided. As the electronic components mounted in the printed circuit board through the battery penetration part are arranged through an insertion process, the battery or the battery cell may be stacked on a printed circuit board so as to be mounted. Thus, it is possible to reduce the necessity of spaces and thereby, various kinds of shapes and sizes of the lithium secondary battery may be realized. Further, it is also possible to enhance the capacity of the secondary battery itself remarkably, and to miniaturize the electronic products.

In addition, when the internal pressure of the secondary battery is increased, the central part of the battery 1000 is swelling larger as compared with the periphery of the battery. Such a swelling phenomenon of the central part of the battery generated due to the increasing pressure may be prevented by a penetration part formed in the battery 1000 according to the present invention. Therefore, stability of the battery 1000 may be enormously improved.

In addition, the battery penetration unit of the battery 1000 may prevent the electrode assembly 100 from being moved in the inner space of the exterior body 200. Therefore, when the electrode assembly 100 is moving in the inner space, the problems that the electrode assembly 100 is damaged or a contact is made between the electrode plates of different polarities of the other electrode assembly 100 and thus, an internal short circuit occurs may be prevented.

MODE FOR CARRYING OUT THE INVENTION

Figure 1:
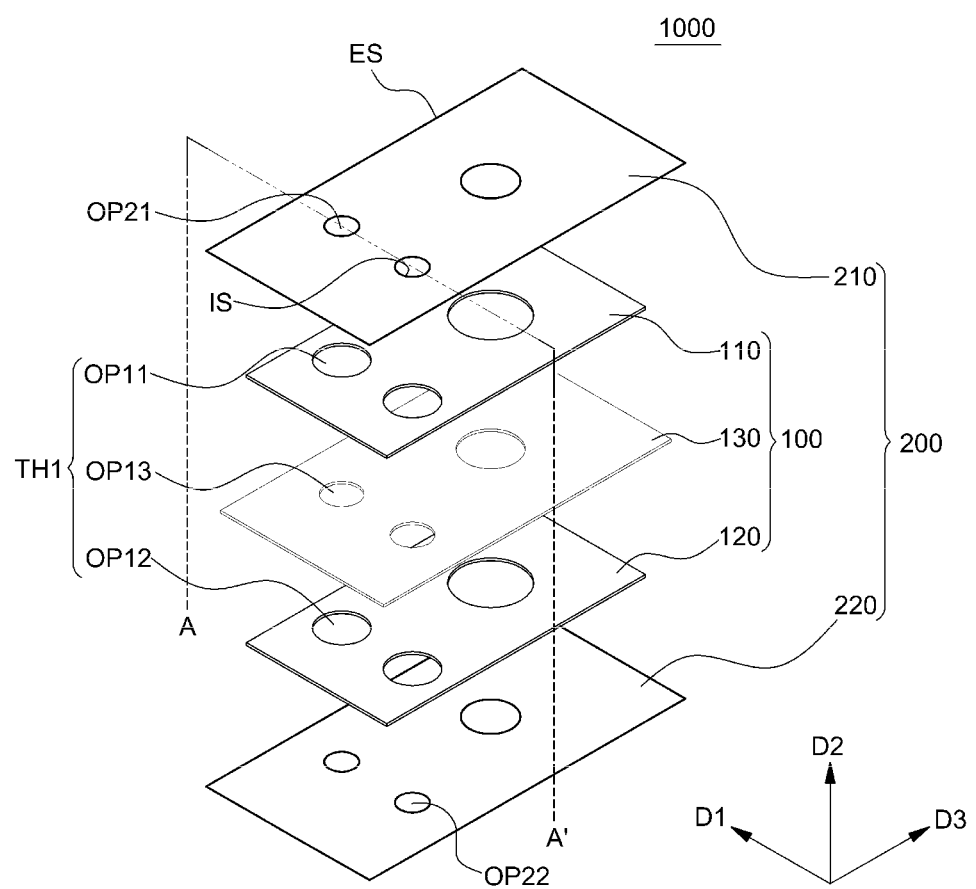
FIG. 1 is a perspective diagram illustrating a battery having an electrode structure according to an embodiment of the present invention.

Hereinafter, preferred embodiments of the present invention will be explained in detail with reference to the accompanying drawings.

The embodiments of the present invention may be provided to the person having a common knowledge in the related art in order to explain the present invention more completely and easily, and the following examples may be changed into other various kinds of embodiments. Further, the scope of the present invention is not limited to the following examples. Rather, these embodiments are provided for describing this disclosure more clearly and for faithfully and completely conveying the concepts of the present invention to the person in the art.

Further, in the following drawings, the thickness and the size of each layer are somewhat expanded for convenience and clarity. In the drawings, the same reference numerals refer to the same elements. As used in this specification, the term "and/or" means that any one of the listed items and more than one all combinations.

The terms used herein are used to illustrate the specific embodiments and are not intended to limit the scope of the invention. Also, although described in a singular type, the present invention may include plural forms unless the context clearly indicates the singular value. It is also to be understood that "comprise" and/or "comprising" as used herein should be interpreted as specifying the presence of mentioned shapes, numbers, steps, operations, members, elements, and/or groups thereof. The term does not exclude the presence or addition of more than one shapes, numbers, operations, members, elements, and/or groups thereof.

As used herein, the terms, "the first" and "the second" may be used to explain various kinds of constituting members, components, regions, layers and/or parts. But, the constituting members, components, regions, layers and/or parts should not be limited by the above terms. The terms must be used only to distinguish the constituting members, components, regions, layers and/or parts from other members, other layers or other parts. Thus, hereinafter, it should be understood that the first constituting members, components, regions, layers and/or parts described as below may indicate the second constituting members, components, regions, layers and/or parts without departing from the teachings of the present invention.

Figure 2:
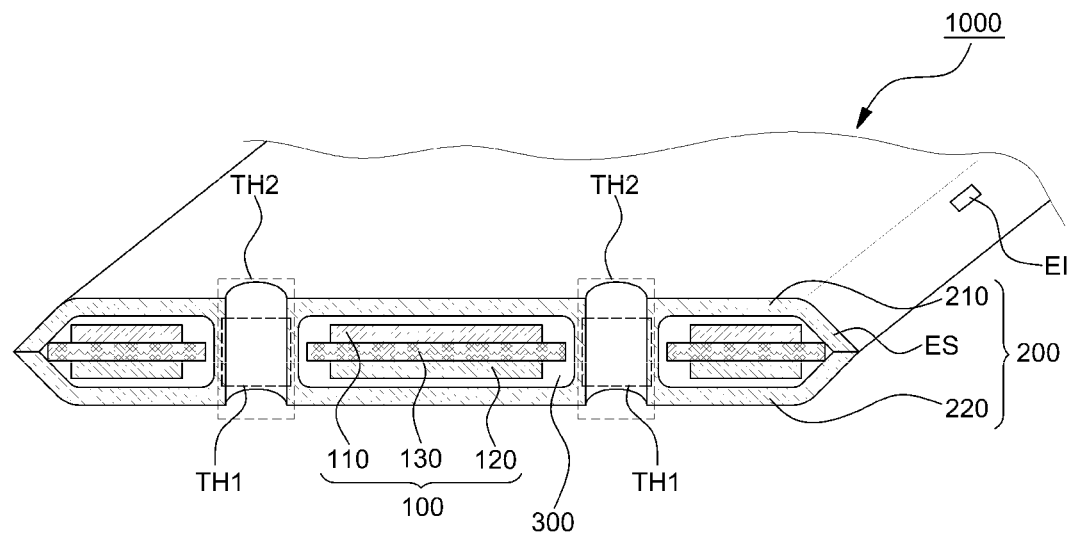
FIG. 2 is a perspective diagram of the battery taken along the line A-A' in FIG. 1.

FIG. 1 is a perspective diagram illustrating a battery having an electrode structure according to an embodiment of the present invention. FIG. 2 is a perspective diagram of the battery taken along the line A-A' in FIG. 1.

Referring to FIG. 1 and FIG. 2, the battery 1000 may include the electrode assembly 100, an exterior body 200 for accommodating the electrode assembly 100 and an electrolyte 300. The electrode assembly 100 includes a cathode layer 110, an anode layer 120 facing the cathode layer 110, and a separation film 130 disposed between the cathode layer 110 and the anode layer 120. In the embodiment according to the present invention, the electrode assembly 100 may be formed by laminating those members or winding after laminating them. In one embodiment, the electrode assembly 100 may have a single layer structure, or a stacked multi-layer bending structure.

The exterior body 200 may include an upper exterior layer 210 and a lower exterior layer 220 facing the upper exterior layer 210 in order to accommodate the electrode assembly 100 and the electrolyte 300. The upper exterior layer 210 and the lower exterior layer 220 may include an exterior sealing part ES in which some parts of edges (a peripheral part) of the upper exterior layer 210 and the lower exterior layer 220 are adhered, and an inner sealing part IS in which the inner peripheral sides of the upper exterior layer 210 and the lower exterior layer 220 are adhered. The electrode assembly 100 may be formed through a step for disposing an electrode assembly 100 between the upper exterior layer 210 and the lower exterior layer 220, a step for laminating the upper exterior layer 210 and the lower exterior layer 220, and a step for winding the upper exterior layer 210 and the lower exterior layer 220 after a laminating step.

The cathode layer 110, the anode layer 120 and the separation film 130 may have a planar shape extending in a first direction D1 and a second direction D2. The cathode layer 110, the anode layer 120, and the separation film 130 may be stacked in the third direction D3. In connection with the first to third directions, an orthogonal coordinate system may be constructed, but the present invention is not limited thereto. For example, the third direction D3 has any value between 0°-90° for a plane defined by the first direction D1 and the second direction D2 without being vertical to the plane. Therefore, these layers are may be stacked in an inclined way.

According to one embodiment of the present invention, at least one of the cathode layer 110 and the anode layer 120 may have a structure in which an active material layer suitable for a concerned polarity is coated on a planar current collector such as a metal foil. In another embodiment, at least one of the cathode layer 110 and the anode layer 120 may also have a suitable structure to form a battery having flexibility. This will be described in detail later with reference to FIG. 3A to 3C.

The cathode layer 110 may include at least more than one first openings OP11. The openings OP11 may be formed in the cathode layer 110. The first openings OP11 of the cathode layer 110 may be formed as a circular shape, a triangular shape, a quadrangle, an elliptical type, or the like. FIG. 1 illustrates the three first openings OP11 having different sizes. However, these shapes are only illustrative and the present invention is not limited thereto.

The anode layer 120 may include at least more than one second openings OP12. The openings OP12 may be formed in the anode layer 120. The second openings OP12 of the anode layer 120 may be formed as a circular shape, a triangular shape, a quadrangle, an elliptical type, or the like. FIG. 1 illustrates the three second openings OP12 having different sizes. However, these shapes are only exemplary and thus, the present invention is not limited thereto.

The separation film 130 may be made of a porous material which is filled with the electrolyte 300 and transfer of ions may be easily realized. For, example, the porous material may be polyethylene terephthalate, polyester, polyacetal, polyamide, polycarbonate, polyimide, polyether ether ketone, polyether sulfone, polyphenylene oxide, polyphenylene sulfide, polyethylene naphthalene, polyvinylidene fluoride, polyethylene oxide, polyacrylonitrile, polyvinylidene fluoride, hexafluoropropylene copolymer, polyethylene, polypropylene, and equivalents thereof, or combinations thereof. The listed materials are merely exemplary and the present invention is not limited thereto. For example, as the separation film 130, a polyolefin series may also be used.

According to one embodiment of the present invention, the separation film 130 may be in the form of a fiber or a membrane. The fibrous separation film may include a non-woven fabric forming a porous web, and may be a Spunbond type formed by long an anodes or Melt blown type. There is no particular limitation on the pore size and porosity of the separation film 130, but the porosity may range within 30% to 95% and the average diameter of the pores may range from 0.01 µm to 10 µm. When the pore size and porosity are less than 0.01 µm and approximately 30%, respectively, it may be difficult to impregnate the electrolyte with sufficient electrolyte due to a decrease in movement of the electrolyte precursor. If the size and porosity are greater than about 10 µm and 95%, it may be difficult to maintain the physical properties and there is a high possibility that a short-circuit may occur between the cathode layer 110 and the anode layer 120.

Although the thickness of the separation film 130 is not limited, it may be in the range of 1 µm to 100 µm, and it is preferable that the thickness is in the range of 5 µm to 50 µm. When the thickness of the separation film 130 is less than 1 µm, it is difficult to maintain the mechanical properties, and when it exceeds 100 µm, it acts as a resistive layer, resulting in lowering the output voltage, and flexibility of a battery may be reduced.

Although a single separation film 130 is illustrated in FIG. 1, the present invention is limited thereto, and two or more separation film 130 may be arranged. In this case, the shapes and the materials of more than two the separation films may be same or different.

According to one embodiment of the present invention, the length of the separation film 130 extending in the first direction D1 is longer than the lengths of the cathode layer 110 and the anode layer 120 extending in the direction D1. When the length of the separation film 130 is shorter than the lengths of the cathode layer 110 and the anode layer 120, the separation film 130 may not sufficiently perform the function to efficiently move ions between the cathode layer 110 and the anode layer 120. Thus, there is a high possibility that a short-circuit may occur between the cathode layer 110 and the anode layer 120.

The separation film 130 may include at least more than one third openings OP13 formed in the separation film 130. The third openings OP13 of the separation film 130 may be formed as a circular shape, a triangular shape, a quadrangle, or an ellipse. FIG. 1 shows three circular third openings OP13 of different sizes. However, these shapes are only exemplary and the invention is not limited thereto.

According to one embodiment of the present invention, the cathode layer 110, the anode layer 120, and separation film 130 disposed between the cathode layer 110 and the anode layer 120 may include at least more than one openings. The openings may be aligned in one direction to form the inner penetrating part TH1. The inner penetrating part TH1 may have a shape such as a circular shape, a triangular shape, a quadrangle, and an ellipse. FIG. 1 shows an example of an inner penetrating part TH1 including three circular first openings OP11, three circular second openings, OP12 and three circular third openings OP13. However, these shapes are only exemplary and the present invention is not limited thereto.

According to one embodiment of the present invention, the inner penetration part TH1 may be formed by aligning the first openings OP11 of the cathode layer 110, the second openings OP12 of the anode layer 120 and the third openings OP13 of the separation film 130. According to one embodiment of the present invention, the width (the size) of the third openings OP13 of the separation film 130 may be smaller than the widths of the first openings OP11 the cathode layer 110 and the second openings OP12 of the anode layer 120. If the width of the third openings OP13 of the separation film 130 may be larger than the widths of the first openings OP11 of the cathode layer 110 and the second openings OP12 of the anode layer 120, there are contacts among some parts of the cathode layer 110 and the anode layer 120, which are opposed to each other, and thus internal short-circuit may occur inside the third openings OP13 of the separation film 130. Therefore, it is preferable that the width of the third openings OP13 of the separation film 130 is formed smaller than the widths of the first openings OP11 of the cathode layer 110 or the second openings OP12 of the anode layer 120.

According to one embodiment of the present invention, the positive lead tab (not shown) and the negative lead tab (not shown) may be adhered to the cathode layer 110 and the anode layer 120 of the electrode assembly 100 by using a laser welding, an ultrasonic welding, or a conductive adhesive, so that a current flow may be made. The positive lead tab or the negative lead tab may be formed so as to protrude from the electrode assembly 100 toward the direction vertical to the direction in the electrode assembly 100 is wound.

The exterior body 200 may include an upper exterior layer 210 and a lower exterior layer 220 facing the upper exterior layer 210 in order to accommodate the electrode assembly 100 and the electrolyte 300. The upper exterior layer 210 and the lower exterior layer 220 may include an exterior sealing part ES in which some parts of edges (a peripheral part) of the upper exterior layer 210 and the lower exterior layer 220 are adhered, and an inner sealing part IS in which the inner peripheral sides of the upper exterior layer 210 and the lower exterior layer 220 are adhered.

According to one embodiment of the present invention, the exterior body 200 may be formed by disposing the electrode assembly 100 between the upper exterior layer 210 and the lower exterior layer 220, and laminating the upper exterior layer 210 and the lower exterior layer 220, or winding the upper exterior layer 210 and the lower exterior layer 220 after laminating them. According to one embodiment of the present invention, the exterior body 200 is arranged to prevent the electrode assembly 100 from swelling when the internal pressure of the secondary battery increases. Thus, it may be formed by a strong material to deformation. For example, the upper exterior layer 210 may be formed by a metal such as a copper. However, the present invention is not necessarily limited to these examples, and the upper exterior layer 210 may be formed by various kinds of materials such as other metals, polymers, composite materials thereof, or a laminated structure thereof.

The upper exterior layer 210 may include at least more than one fourth openings OP21 formed inside the upper exterior layer 210. The fourth openings OP21 of the upper exterior layer 210 may be formed as a circular shape, a triangular shape, a quadrangle, or an ellipse. FIG. 1 shows the three circular fourth openings OP21 having different sizes, respectively. However, these shapes are only exemplary and thus, the present invention is not limited thereto.

According to one embodiment of the present invention, at least the exterior surface of the exterior body 200 may be formed by a non-conductive material. For example, the entire exterior body 200 may be uniformly formed by polymer, paper, or an electrically non-conductive material such as fabrics. However, the present invention is not limited to this embodiment, and the lower exterior layer 220 may be formed by other metals or various materials such as polymers.

Similar to the upper exterior layer 210, the lower exterior layer 220 may include at least more than one fifth openings OP22 formed within the lower exterior layer 220. The fifth openings OP22 of the lower exterior layer 220 may be formed as a circular shape, a triangular shape, a quadrangle, or an ellipse. FIG. 1 shows the three circular fifth openings OP22 having different sizes, respectively. However, these shapes are only exemplary and thus, the present invention is not limited thereto.

According to one embodiment of the present invention, the exterior body 200 may be formed by an inner core layer and an exterior coating layer. In this case, the inner core layer may be formed by a metal film so that a mechanical strength, a moisture resistance, or barrier properties may be secured. The exterior coating layer may be formed by an electrically nonconductive material for ensuring electrical insulation. In connection with the exterior body 200 wherein at least more than one surfaces are formed of an electrically non-conductive material, even if the electrode plates of the electrode assembly 100 are in contact with the exterior body 200, an internal short circuit of the assembly 100 generated due to the exterior body 200 may be prevented.

The exterior sealing part ES is a section where formed by a part of edges (exterior periphery) of the upper exterior layer 210 and a part, and a part of edges (exterior periphery) of the lower exterior layer 220 are adhered each other. The electrode assembly 100 and the electrolyte 300 are accommodated inside the exterior body 200 by the exterior sealing part ES. The exterior sealing part ES may be formed by adhering the upper and lower exterior layers 210 and 220 via a heat fusion, an ultrasonic welding, or an adhesive. The lower exterior layer 220 may be arranged so as to face the upper exterior layer 210.

The inner sealing part IS is a section where the inner circumferences of the upper and lower exterior layers 210 and 220 are adhered. According to one embodiment of the present invention, the inner sealing part IS includes an inner penetration part TH1 and may form a battery penetration part TH2 which penetrates from the inner periphery of the upper exterior layer 210 to the inner periphery of the lower exterior layer. The battery penetration part TH2 may be formed as a circular shape, a triangular shape, a quadrangle, or an elliptical shape. FIG. 2 illustrates two battery penetration parts TH2. However, these shapes are only exemplary and the present invention is not limited thereto.

According to one embodiment of the present invention, the shape of the inner penetration part TH1 of the battery penetration part TH2 may be identical to that of the battery penetration part TH2. According to one embodiment of the present invention, the shape of the inner penetrating part TH1 of the battery penetrating part TH2 may be different from that of the battery penetrating part TH2. The battery penetrating part TH2 may be formed by aligning the inner penetration part TH1 formed by aligning the first openings OP11 of the cathode layer 110, the second openings OP12 of the anode layer 120, and the third openings OP13 of the separation film 130 in one direction; the fourth openings OP21 of the upper exterior layer 210; and the fifth openings OP 22 of the lower exterior layer 220 in one direction.

According to one embodiment of the present invention, the surfaces where the fourth openings OP21 of the upper exterior layer 210 are facing the fifth openings OP 22 of the lower exterior layer 220, or those opening are in a contact with each other may be formed by the inner sealing part IS. Therefore, the inner penetration part TH1 of the electrode assembly 100 may be sealed by the inner sealing part IS.

According to one embodiment of the present invention, the widths of the fourth openings OP21 of the upper exterior layer 210 and the fifth openings OP22 of the lower exterior layer 220 may be smaller than that of the inner penetration part TH1 of the electrode assembly 100.

If the fourth openings OP21 of the upper exterior layer 210 and the fifth openings OP22 of the lower exterior layer 220 are larger than the width of the inner penetration part TH1 of the electrode assembly 100, the exterior body 200 may not completely seal the electrode assembly 100 and thus, the electrolyte 300 may be leaked out from the sealing part IS. When the electrolyte 300 may leaked from the exterior body 200, the efficiency of the battery 1000 may be tremendously reduced. Therefore, the widths of the fourth openings OP21 of the upper exterior layer 210 and the fifth openings OP22 of the lower exterior layer 220 may be smaller than that of the widths of the first openings OP11, the second openings OP12, and the third openings OP13 of the electrode assembly 100.

For example, the widths of the battery penetration part TH2 formed by the fourth openings OP21 of the upper exterior layer 210, and the fifth openings OP21 of the lower exterior layer 220 may be smaller, as compared with the width of the third openings OP13 of the separation film 130 of the electrode assembly 100.

Figure 3A:
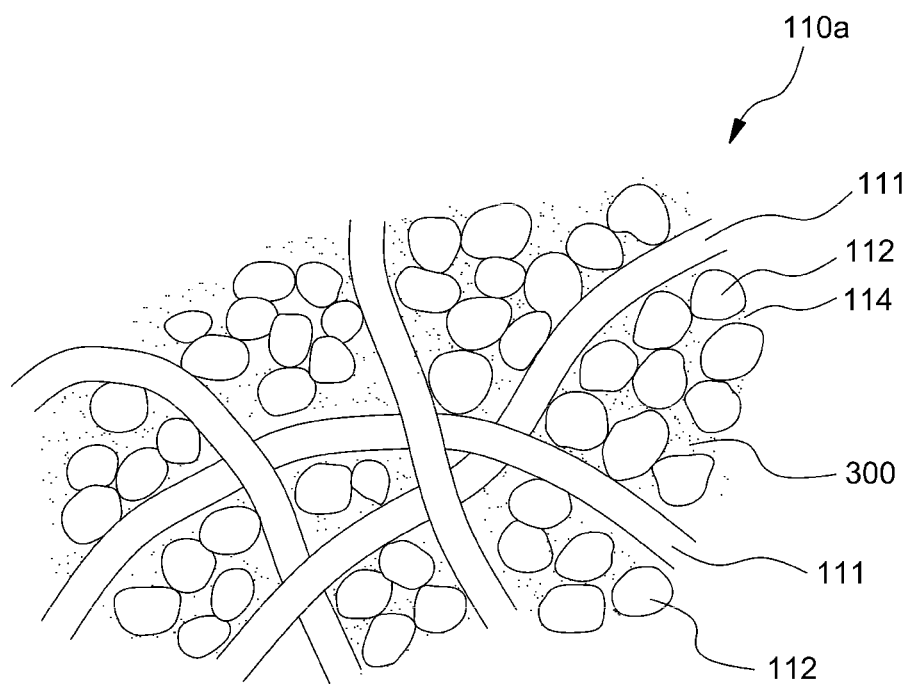
FIG. 3A to 3C are enlarged diagrams of electrodes of an electrode assembly according to an embodiment of the present invention.
Figure 3B:
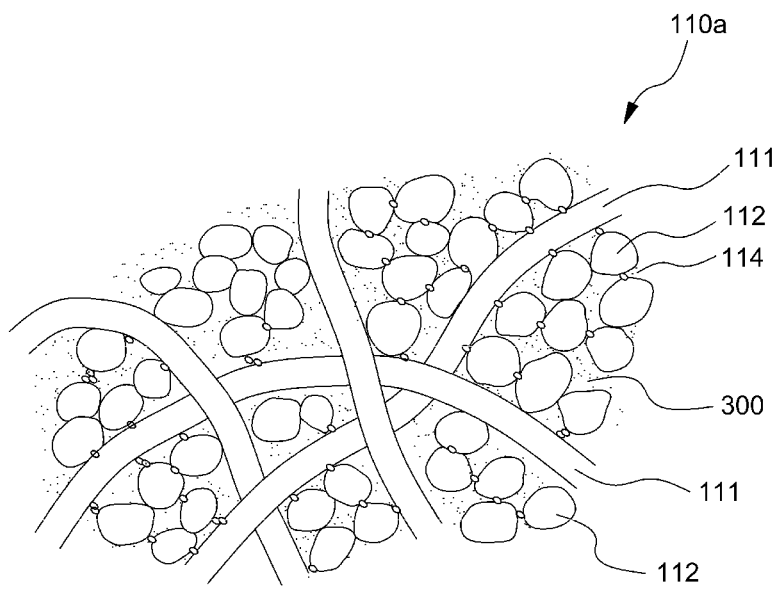
Figure 3C:
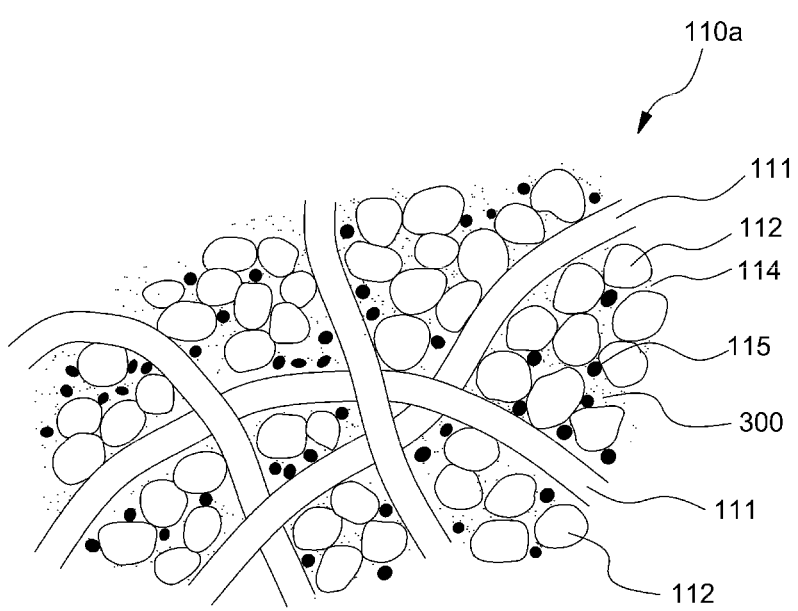

FIG. 3A through 3C are the magnified diagrams illustrating one electrode of an electrode assembly according to an embodiment of the present invention.

Referring to FIG. 3A, the electrode 110a includes a metal fiber type current collector 111 and a particle-active material 112, and a liquid electrolyte or gelling and/or a solidified electrolyte 300 between them is provided. The electrode 110a may be any one of a positive electrode and a negative electrode, and the invention is not limited to thereto.

The electrode 110a may include a metal fiber type current collector for forming a conductive network wherein a plurality of metal fibers is in contact with each other, and a heat conduction network. The metal-fiber-type current collector may form a conductive network having porosity, wherein a plurality of metal fibers is randomly arranged, physically contacted with each other, are bended or broken, and tangled to each other, and thereby, they are mechanically fastened each other. According to one embodiment of the present invention, the conductive network may form non-woven structure. The plurality of metal fibers may optionally include two or more different kinds of metals or other metals having different lengths.

The metal fiber type current collector includes stainless steel, aluminum, nickel, titanium, copper or any one of alloys thereof, or combinations thereof. For example, in case of a cathode layer 110, an aluminum which is not oxidized at a high potential region, or alloys thereof may be used for forming the metal fiber type current collector. In case of an anode layer 120, a cooper, a stainless steel, nickel or alloys thereof which are electrochemically inactive in the low operating potential may be used for forming a metal fiber type collector.

In some embodiments, a metal foil (not shown) of a plate shape may be combined to one side of the metal fiber type current collector. Combination of the metal fiber type current collector and the metal foil may be implemented by adhering via a heat fusion, an ultrasonic welding or an adhesive.

In all of the above-described embodiments, only the cathode layer 110 and the anode layer 120 including a structure of a metal fiber type current collector are described. But, these embodiments are only exemplary, and only any one of the cathode layer 110 and the anode layer 120 may have the structure of the metal fiber type current collector.

According to one embodiment of the present invention, the cathode layer 110 or the anode layer 120 may be provided by impregnating the metal fiber type current collector with an active material, or by coating a metal fiber of the metal fiber type current collector. As shown in FIG. 3A, a metal fiber type current collector 111 is generally formed as a straight line and a bended type, but as another embodiment of the invention, the metal fiber current collector 111 may be molded so as to have a regular and/or an irregular shape such as a curly or spiral shape The metal fiber type current collector 111 having the above-mentioned a straight line, a bended type, or a regular and/or an irregular shape form a heat conduction network with high thermal conductivity via the physical contacts with each other in the electrode 110$a$. The heat conduction network is formed when more than one metal fiber type current collector 111 are bended or broken, and tangled to each other, mutually contacted or combined. Thus, the heat conduction network may have porosity, mechanical firmness and flexibility obtained due to the fiber properties.

The active material 112 in the form of particles is tightly bonded to the heat conduction network provided by a metal fiber type current collector 111. Since the active material 112 is tightly bonded to the heat conduction network, the size of the pores and porosity of the heat conduction network to form the metal fiber type current collector 111 may be adjusted properly. A step for adjusting the size of pores and adjustment of the porosity may be carried out by adjusting a mixing weight ratio when being mixed with the active material 112 in the entire electrode 110$a$ of the metal fiber type current collector 111.

The gelled or solidified electrolyte 300 is tightly bonded to the pore provided between a metal fiber type current collector 111 and an active material 112. Further, the gelled or solidified electrolyte 300 is arranged so that it may be in contact with the entire interface of an active material 112 of a particle form. Accordingly, in connection with the electrolyte 300, a wetting and the contact properties are improved as far as the active material 112 is concerned, so that a contact resistance between the electrolyte 300 and the active material 112 may be reduced, and the electrical conductivity may be increased.

As shown in FIG. 3B, a binder 114 may be further added to the electrode 110$a$, so that the active material 12 in the form of particles may be tightly bonded to the heat conduction network. The binder 114 may be, for example, the polymer materials such as vinylidene fluoride-hexafluoro-propylene copolymer (PVdF-co-HFP), polyvinylidenefluoride (PVdF), polyacrylonitrile, polymethylmethacrylate, polytetrafluoroethylene (PTFE), styrene-butadiene rubber styrenebutadiene rubber (SBR), polyimide, polyurethane-based polymer, polyester-based polymers, and ethylene-propylene-diene copolymer (EPDM) be a polymer-based material. The present invention is not necessarily limited to these examples, and the material of the binder having a predetermined cohesive power and stability under the electrochemical environment while dissolving in the electrolyte 300 may be employed.

As shown in FIG. 3C, a conductive material 115 may be further added to the electrode 110$a$ for improving the electrical conductivity of the electrode 110$a$. The conductive material 115 may be, for example, fine carbon such as carbon black, acetylene black, ketchen black, and ultra-fine graphite particles; a nano metal particle paste; or ITO (indium tin oxide) paste; or the nano structure having a large specific surface area and a low resistance such as a carbon nano tube. In connection with the electrode 110$a$ in accordance with an embodiment of the present invention, since the metal fiber type current collector 111 having a micro size corresponding to the active material 112 is able to perform the same role as the role of the conductive material 115, there is an advantage that may suppress the increase in manufacturing cost due to the addition of the conductive material 115.

In another embodiment, even if it is not shown, the above-described porous ceramic particles may be further added into the electrode 110$a$. The porous ceramic particles may include, for example, porous silica. The porous ceramic particles facilitate the electrolyte 300 to be impregnated into the electrode 110$a$.

The electrolyte 300 may be accommodated in the exterior body 200 of the battery 1000. The electrolyte 300 may be absorbed in the electrode assembly 100. For example, the battery 1000 may be formed by absorbing a suitable aqueous electrolyte electrode solution including a salt such as potassium hydroxide (KOH), potassium bromide (KBr), potassium chloride (KCL), zinc chloride ($ZnCl_2$) and sulfuric acid ($H_2SO_4$) into the cathode layer 110, the anode layer 120, and/or the separation film 130 of the electrode assembly.

In another embodiment, the battery 1000 may be a non-aqueous electrolyte such as ethylene carbonate, propylene carbonate, dimethyl carbonate or di-ethyl carbonate which include a lithium salt such as $LiClO_4$ or $LiPF_6$. The present invention is not limited to these materials. Further, although not shown, a suitable cooling device or battery managing system may be connected to the battery 1000 for controlling a power supply characteristics and stability of a battery 1000 while being used.

Figure 4:
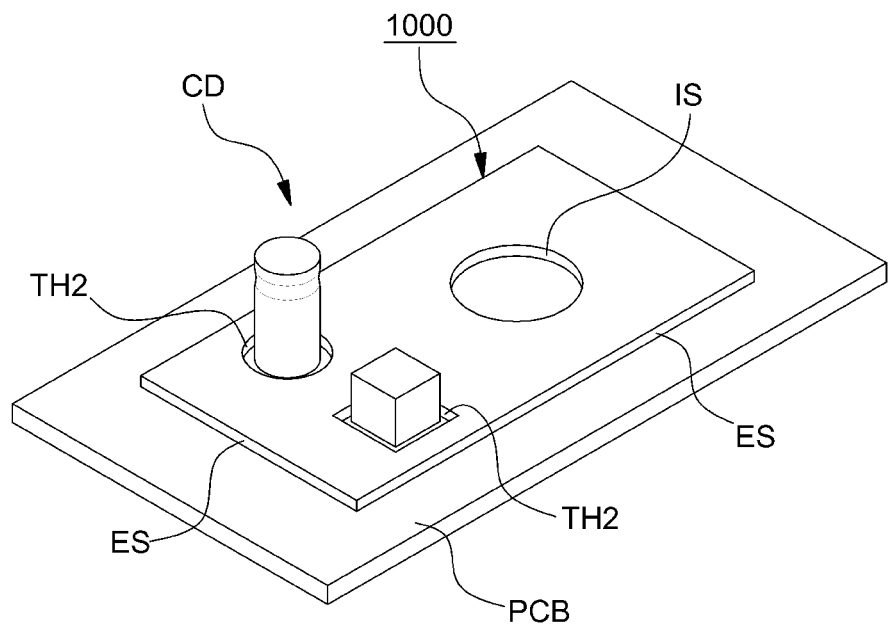
FIG. 4 is a perspective diagram showing a structure in which a secondary battery having a battery penetrating part is laminated on a circuit board according to an embodiment of the present invention.

FIG. 4 is a perspective diagram showing a laminated structure wherein a secondary battery having a battery penetration is laminated on a printed circuit board according to one embodiment of the present invention.

Referring to FIG. 4, the battery 1000 may be disposed on a printed circuit board PCB. PCB (Printed Circuit Board) is a printed wiring plate for forming the electrical wirings between the electronic components on an insulating layer according to a circuit design, and PCB is also referred as PCB substrate, a printed circuit plate, or a printed wiring board.

For example, a printed circuit board (PCB) is defined as a board formed from a FR4 substrate, MCPCB (metal core printed circuit board), and a cast polymer resin cross-linked by using ultraviolet radiation, or a circuit board selected from the structures of any other circuit boards which could be easily understood by the person in the related art.

In general, such a printed circuit board is being manufactured by a step for mounting a copper foil on the surfaces of a phenol resin or an epoxy resin insulating layer; a step for forming necessary circuit patterns by etching the copper foil according to the circuit pattern; and a step for densely mounting various kinds of electronic components such as IC chips, capacitors, resistors on the circuit patterns, The printed circuit board is classified into a single substrate, a double-sided substrate or a multi-layer substrate according to the number of circuit layers and insulating layers. As the number of layers in increasing, the mounting capability of the electronic components are getting more excellent. A PCB including the multi-layers for producing are used for producing the products requiring very high precision.

The printed circuit board (PCB) includes, a substrate, electronic components (CD) formed on the substrate. The electronic components (CD) may be the components of a common printed circuit board such as at least more than one IC chips, capacitors, resistors.

According to one embodiment of the present invention, it is possible to arrange the electrode assembly 100 between the upper exterior layer 210 and the lower exterior layer 220, and the exterior body 200 may be formed by laminating the upper exterior layer 210 and the lower exterior layer 220 or winding the upper exterior layer 210 and the lower exterior layer 220 after laminating them. The battery 1000 may include the fourth openings OP21 and the fifth openings OP22 formed in the electrode assembly 100 and the exterior body 200. The fourth openings OP21 and the fifth openings OP22 may be formed as a circular shape, a triangular shape, a quadrangle, and an elliptical shape. FIG. 1 shows three circular fourth openings OP21 and fifth openings OP22 having different sizes. However, these shapes are only exemplary, and the present invention is not limited to these shapes. The listed shapes are only exemplary, and the present invention is not limited to thereto.

According to one embodiment of the present invention, the electronic components (CD) of the printed circuit board (PCB) may be inserted into, or may be protruded from the battery 1000 after passing through the battery penetration part TH2 formed by aligning the first openings OP11, the second opening OP12, the third opening OP13, the fourth opening OP21 and the fifth openings OP22 of the battery 1000 in one direction. The electronic components (CD) of a printed circuit board (PCB) may be assembled with the battery 1000. It may not be necessary to secure a space for an additional printed circuit board (PCB) for accommodating the battery 1000.

According to an embodiment of the present invention, the inner penetration part TH1 is formed in the electrode assembly 100 consisting of the cathode layer, the anode layer, and the separation film. A battery or a battery cell including the battery penetration part TH2 passing through from the upper to the lower exterior layer exterior layer may be provided by forming the battery penetration part TH2 including the inner penetration part TH1 from the exterior body 200 for accommodating the electrode assembly 100 therein. According to one embodiment of the present invention, as the electronic components mounted in the printed circuit board through the battery penetration part TH2 are arranged through an insertion process, the battery may be stacked on a printed circuit board so as to be mounted. Thus, it is possible to reduce the necessity of spaces, and various kinds of shapes and sizes of the lithium secondary battery may be realized. Further, it is also possible to enhance the capacity of the secondary battery itself remarkably, and to miniaturize the electronic products.

In addition, when the internal pressure of the secondary battery is increased, the central part of the battery remarkably swells as compared with the periphery of the battery. This phenomenon that the central part of the battery swells according to the increasing pressure may be prevented. Therefore, stability of the battery may be enormously improved.

Also, the battery penetration unit may prevent the electrode assembly 100 from being moved in the inner space of the exterior body 200. Therefore, when the electrode assembly 100 moves in the inner space, the problems that the electrode assembly 100 is damaged or a contact is made between the electrode plates of different polarities of the other electrode assembly 100 and thus, an internal short circuit occurs may be prevented.

Figure 5:
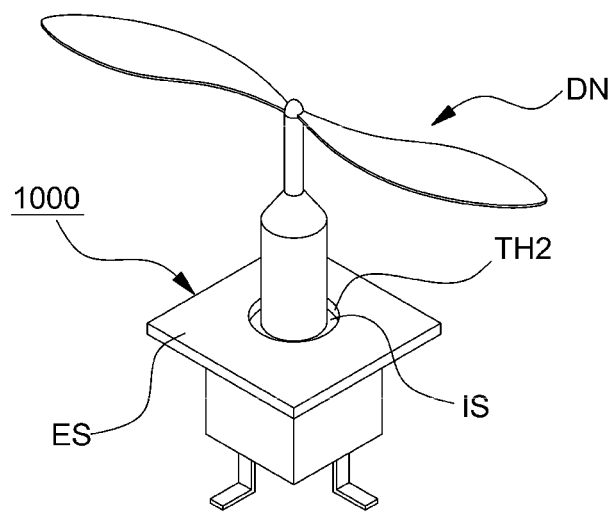
FIG. 5 is a perspective diagram showing a structure in which a secondary battery having a battery penetrating part is installed on a drone according to an embodiment of the present invention.

FIG. 5 is a perspective diagram illustrating a structure in which a secondary battery having a battery penetration unit is laminated on the drone in accordance with one embodiment of the present invention.

Referring to FIG. 5, the battery 1000 may be installed in the drone DN. According to one embodiment of the present invention, drone DN may be referred to the drone. In addition, size or shape of drone DN may be varied in accordance with the intended use. For example, the drone DN may be used for military, rescue, or civilian purposes.

According to one embodiment of the present invention, the drone DN includes at least more than one rotary blade, and a rotor and a driving unit for rotating each of the rotary blade. The rotary blades may be rotated by power force of a drive unit. In the driving unit, at least more than one motor, the camera or GPS may be installed. Drone DN may be controlled by an adjusting device. In an example, drone DN may be adjusted by wireless adjustment device or automatic navigation equipment.

According to one embodiment of the present invention, the battery 1000 including a battery penetration unit TH2 may be installed on a drone DN. Furthermore, the drone DN having passed through the battery penetration unit TH2 of the battery 1000 drone DN is inserted through the battery penetration unit TH2, or may be projected. Therefore, the drone DN may be assembled together with the battery 1000 and thus, it is not necessary to install an additional power supply that provides power on the drone DN.

According to an embodiment of the present invention, an inner penetration part TH1 is formed in an electrode assembly 100 consisting of a cathode layer, an anode layer, and a separation film, and the battery penetration unit TH2 including an inner penetration part TH1 is formed from an exterior body 200 for accommodating the electrode assembly 100 therein. Thus, a battery or a battery cell may be provided in which the battery penetration unit TH2 passing through from the upper exterior layer to the lower exterior layer is formed. According to one embodiment of the present invention, a battery is installed on a drone through the battery penetration unit TH2, and the battery may be mounted on the drone. Thus, various kinds of shape and size of the lithium secondary battery may be realized and it is also possible to miniaturize the drone while enhancing capacity of the secondary battery itself by reducing the need for a power supply device for providing a separate power source.

FIG. 6A-6G are cross-sectional diagrams illustrating a method of manufacturing a secondary battery according to an embodiment of the present invention.

Figure 6A:
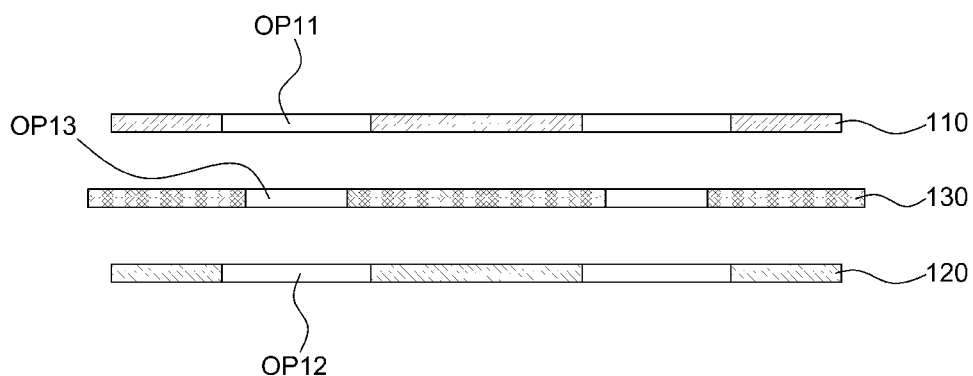
FIG. 6A to 6G are cross-sectional diagrams illustrating a method of manufacturing a secondary battery according to an embodiment of the present invention.

Referring to FIG. 6A, the electrode assembly 100 is formed. In order to form the electrode assembly 100, the cathode layer 110, the anode layer 120 and the separation film 130 disposed between the cathode layer 110 and the anode layer 120 are prepared. The cathode layer 110 may include at least more than one first openings OP11 formed in one region. According to one embodiment of the present invention, the first openings OP11 may be formed on the cathode layer 110 of a plate shape by using a punching equipment P. The punching equipment P may comprise an end portion of a pin shape capable of passing through the surface of the cathode 110. For example, a drill, an iron or a hollow pipe may be used as the punching equipment.

The anode layer 120 may include at least more than one second openings OP12 formed on one region. According to one embodiment of the present invention, the second openings OP12 may be formed on the anode layer 120 of the plate shape by a punching equipment. The punching equipment P may comprise an end portion of a pin shape capable of passing through the surface of the anode layer 120. For example, a drill, an iron or a hollow pipe may be used as a punching equipment.

The separation film 130 may include at least more than one third openings OP13 formed on one region. According to one embodiment of the present invention, the third openings OP13 is formed on the film 130 of a plate shape by a punching equipment P. The punching equipment P may include an end portion of a pin shape capable of passing through the surface of the separation film 130. For example, a drill, an iron or a hollow pipe may be used as a punching equipment.

According to one embodiment of the present invention, the widths of the third openings OP13 of the separation film 130 may be formed such that they are smaller than those of the first openings OP11 of the cathode layer 110 and the second openings OP12 of the anode layer 120. If the widths of the third openings OP13 of the separation film 130 may be formed such that they are larger than those of the first openings OP11 of the cathode layer 110 and the second openings OP12 of the anode layer 120, the internal short-circuit of the cathode layer 110 and the anode layer 120 may occur. Therefore, it is preferable that the third openings OP13 of the separation film 130 are smaller than those of the first openings OP11 of the cathode layer 110 and the second openings OP12 of the anode layer 120.

According to one embodiment of the present invention, the separation film 130 may be parallel to the cathode layer 110 and anode layer 120. Furthermore, a porous separation film as well as the separation film 130 may be formed additionally between the cathode layer 110 and anode layer 120. According to one embodiment of the present invention, the length of the uni-directionally formed separation film 130 may be longer than the length of uni-directionally formed the cathode layer 110 and the anode layer 120. When the length of the separation film 130 is formed shorter than the length of the cathode layer 110 and anode layer 120, the separation film 130 may not effectively perform a function moving ions between the cathode layer 110 and the anode layer 120. As a result, a short-circuit may occur between the cathode layer 110 and the anode layer 120.

According to one embodiment of the present invention, a positive lead tab not shown and a negative lead tab not shown may be adhered to the cathode layer 110 and the anode layer 120 in electrode assembly 100, respectively via a welding process such as a laser welding, ultrasonic welding, and resistance welding, or a conductive adhesive, so that current flow may be made swimmingly. The positive electrode lead tab or the negative electrode lead tab may be formed so as to protrude from the electrode assembly 100 toward the direction perpendicular to the direction in which the electrode assembly 100 is wound.

Figure 6B:
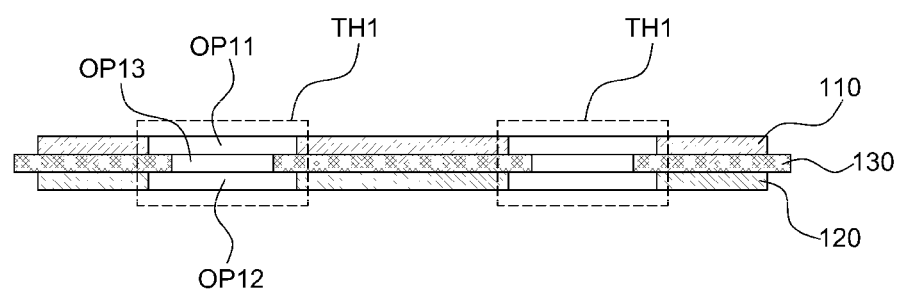

Referring to FIG. 6B, the anode layer 120, the separation film 130 and the cathode layer 110 may be laminated according to the sequential order as described above. According to one embodiment of the present invention, the cathode layer 110, the separation film 130 and the anode layer 120 may be arranged in one direction and may be stacked according to the sequential order as described above. The first openings OP11 of the cathode layer 110, the second openings OP12 of the anode layer 120, and the third openings OP13 of the separation film 130 may be arranged in one direction so that an inner penetration unit TH1 may be formed. The inner penetration unit TH1 may be formed so as to have shapes such as a circle, a triangle, a quadrangle, and an ellipse may be formed. The enumerated shapes are described only as examples and the present invention is not limited to these shapes.

Figure 6C:
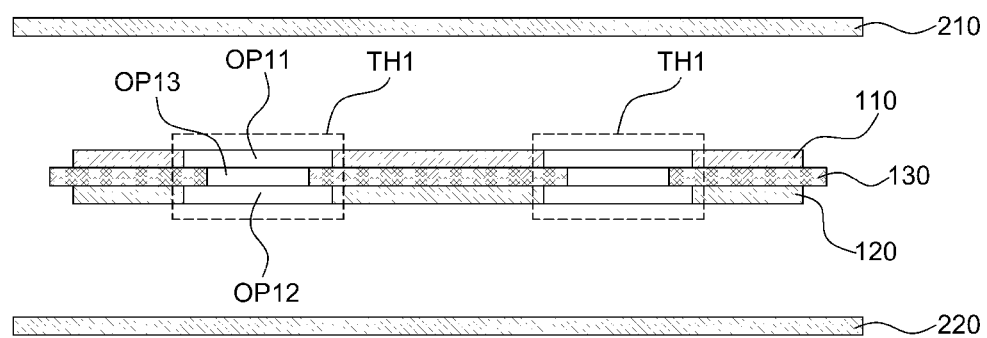
Figure 6D:
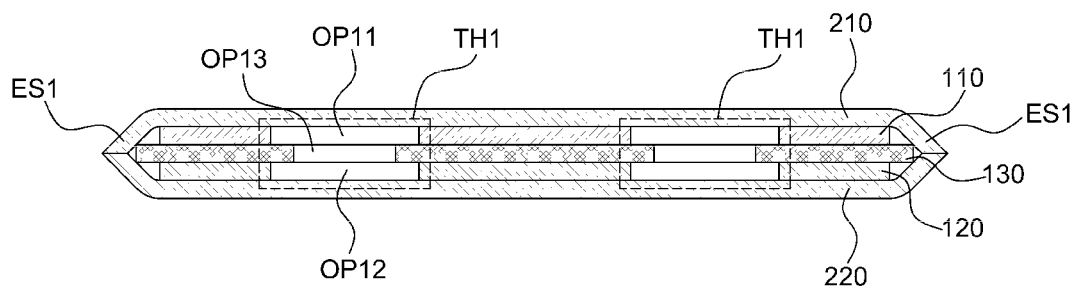

Referring to FIG. 6C, an exterior body 200 may be formed in order to accommodate the electrode assembly 100 and electrolyte 300, and an upper exterior layer 210 and the lower exterior layer 220 of a plate shape may be prepared in order to form an exterior body 200. Referring to FIG. 6D, an exterior sealing part ES1 may be formed by attaching the upper exterior layer 210 and the lower exterior layer 220 to one side of the electrode assembly 100, and sealing the edge zone of the upper exterior layer 210 and the lower exterior layer 220.

At the edges of the upper exterior layer 210 and a lower outer layer 220, the portion where the edge surfaces of the upper exterior layer 210 and the exterior surface layer 220 are bonded to each other may be an exterior sealing part ES1. The exterior sealing part ES1 may cover the cathode layer 110, the anode layer 120 and a lateral side of the separation film 130 of the electrode assembly 100. According to one embodiment of the present invention, the exterior sealing part ES1 may be formed by compressing the edges of the upper exterior layer 210 and the lower exterior layer 220 to each other using a pressing equipment. Further, the exterior sealing part ES1 may be formed by attaching the edges of an upper exterior layer 210 and a lower exterior layer 220 to each other via a heat fusion, an ultrasonic welding or an adhesive.

Figure 6E:
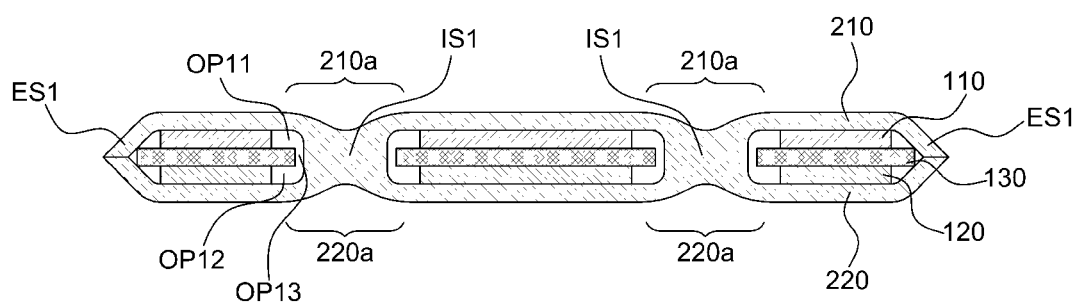

Referring to FIG. 2 and FIG. 6D together, the exterior sealing part ES1 may be formed by adhering some portions of the respective edge surfaces of an upper exterior layer 210 and the lower exterior layer 220a. At this time, an electrolyte injection hole EI through which electrolyte 300 is to be injected may be further formed along the respective edge portions of an upper exterior layer 210 and the lower exterior layer 220. Referring to FIG. 6E, it is possible to form an inner sealing part IS1 by adhering the respective opposite parts of the upper exterior layer 210 and the lower exterior layer 220 of the exterior body 200. The inner sealing part IS1 may be the part where a portion 210a of the upper exterior layer 210 at which the inner penetration part TH1 illustrated in FIG. 6G is to be formed and a portion 220a of the lower exterior layer 220 are mutually adhered.

According to one embodiment of the present invention, the inner sealing part IS1 may be formed by mutually compressing the portion 210a of the upper exterior layer 210 corresponding to a region where the inner penetration part TH1 is to be formed, and the portion 220a of the lower exterior layer 220 corresponding to a region where the inner penetration part TH1 is to be formed via a pressing equipment. Further, the inner sealing part IS1 may be formed by mutually compressing the portion 210a of the upper exterior layer 210 corresponding to a region where the inner penetration part TH1 is to be formed, and the portion 220a of the lower exterior layer 220 corresponding to a region where the inner penetration part TH1 is to be formed via a heat fusion, an ultrasonic welding or an adhesive.

Figure 6F:
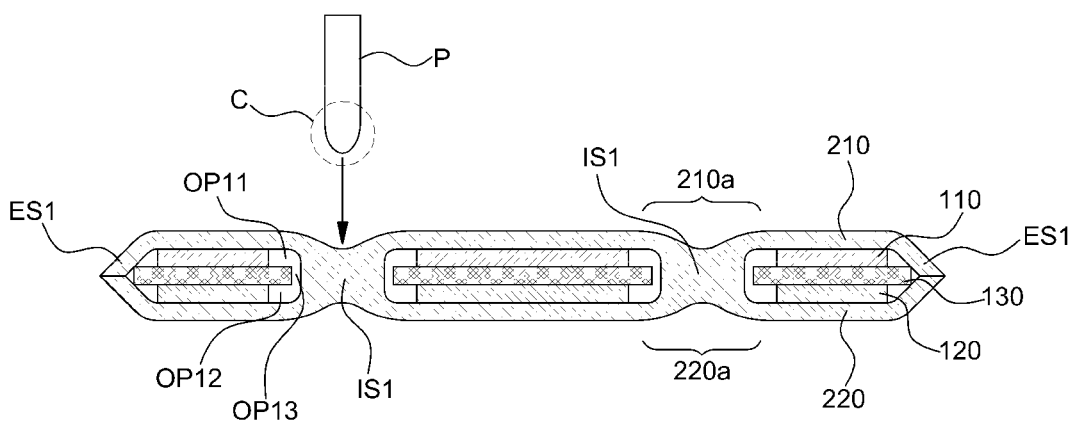
Figure 6G:
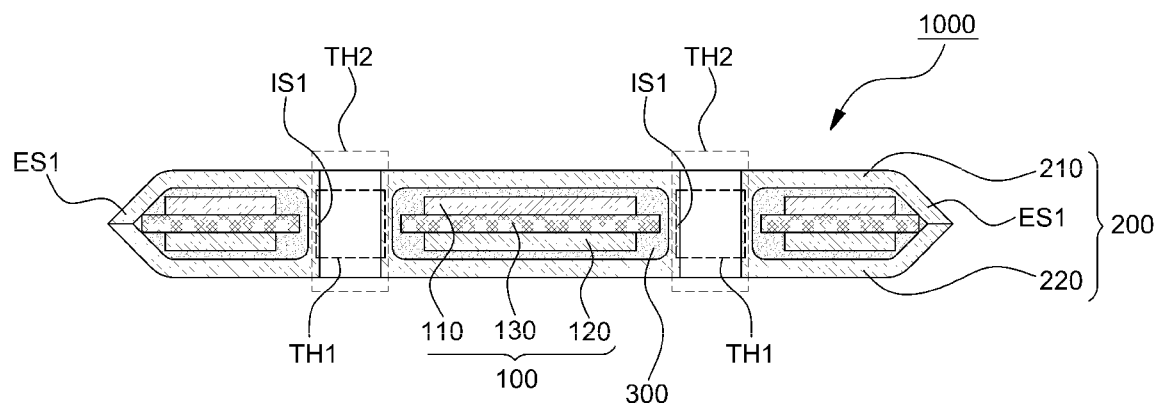

Referring to FIG. 6F, a punching equipment P may penetrate from the portion 210a of the upper exterior layer 210 corresponding to a region where the inner sealing part IS1 is to be formed, until the portion 220a of the lower exterior layer 220 corresponding to a region where the inner sealing part IS1 is to be formed. According to one embodiment of the present invention, the moving direction of the punching equipment P penetrating from the portion 210a of the upper exterior layer 210 to the portion 220a of the lower exterior layer 220 may be represented by an arrow in FIG. 5F.

The punching equipment P may include a punching part C which may penetrate from the portion 210a of the upper exterior layer 210 corresponding to a region where the inner sealing part IS1 is formed, to the portion 220a of the lower exterior layer 220 corresponding to a region where the inner sealing part IS1 is formed. The punching portion C of the punching equipment P may include an end of a sharp pin shape. For example, a drill, an iron or a hollow pipe may be used as the punching equipment. In one embodiment, it is possible to pass through the punching part C from the portion 210a of the upper exterior layer 210 corresponding to the area of the inner sealing part IS1 formed from the inner penetration part TH1 until the portion 220a of the lower exterior layer 220.

Referring FIG. 2 and FIG. 6G together, at least more than one fourth opening OP21 passing through the upper exterior layer 210 corresponding to a region where the inner sealing part IS1 is formed; at least more than one fifth opening OP22 passing through the lower exterior layer 220 corresponding to a region where the inner sealing part IS1 is formed, may be formed via a punching equipment P. The fourth opening OP21 and the fifth opening OP22 may be formed as a circle, a triangle, a quadrangle, an ellipse. However, these shapes are only to be illustrative of the present invention and it is not limited thereto.

According to one embodiment of the present invention, the fourth openings OP21 are formed from the portion 210a of the upper exterior layer and the fifth openings OP22 are formed from the portion 220a of the lower exterior layer OP22 is formed. The respective surfaces of the upper exterior layer 210 and the lower exterior layer 220 adjacent to the inner penetration part TH1 may be adhered to each other. According to one embodiment of the present invention, the widths of the fourth openings OP21 of the upper exterior layer 210 and the opening OP22 of the lower exterior layer 220 may be formed smaller than the width of the inner penetration part TH1 of the electrode assembly 100.

If the widths of the fourth openings OP21 of the upper exterior layer 210 and the openings OP22 of the lower exterior layer 220 may be formed larger than the width of the inner penetration part TH1 of the electrode assembly 100, since the exterior body 200 may not completely seal the electrode assembly 100, there is a possibility that the electrolyte 300 may be leaked from the inner sealing part IS1. Further, if the electrolyte 300 is discharged to an outside space from the exterior body 200, the efficiency of the battery 1000 may be reduced remarkably. Thus, the exterior body 200 may be formed smaller than those of the fourth openings OP21 of the upper exterior layer 210 and the opening OP22 of the lower exterior layer.

According to one embodiment of the present invention, a battery penetration part TH2 at least more than one passing through the fourth openings OP21 of the upper exterior layer 210, the first openings OP11 of the cathode layer 110, the third openings OP13 of the separation membrane 130, the second openings OP12 of the anode layer 120, and the fifth openings OP22 of the lower exterior layer 220 may be formed by using the punching equipment P.

The battery penetration part TH2 may be formed by aligning the first openings OP11 of the cathode layer 110, the second openings OP12 of the anode layer 120, the third openings OP13 of the separation membrane 130, the fourth openings OP21 of the upper exterior layer 210, and the fifth openings OP22 of the lower exterior layer 220 in one direction. The battery penetration part TH2 may be formed as a circle, a triangle, a quadrangle, an ellipse. The shape of the battery penetration part TH2 may be changed according to a shape of the punching portion C of the punching equipment P. The listed shapes are only illustrative of the present invention and it is not limited to these shapes.

According to one embodiment of the present invention, the inner penetration part TH1 and the battery penetration part TH2 may be formed as a same shape. If the inner penetration part TH1 and the battery penetration part TH2 may are formed as a same shape, it is possible to extend the internal space of the exterior body 200. Thus, the amount of an electrolyte 300 that may be injected into the exterior body 200 may be maximized. In the example, the shapes of the inner penetration part TH1 and the battery penetration part TH2 may be formed differently.

According to one embodiment of the present invention, as compared with the width of the third openings OP13 of the separation film 130 of the electrode assembly 100, the width of the battery penetration part TH2 which is formed by fourth openings OP21 of the upper exterior layer 210 and the fifth openings OP22 of a lower exterior layer 220 may be formed to be smaller. In the example, after the battery penetration part TH2 is formed, the electrolyte 300 may be injected to the inside of the exterior member 200 through an electrolyte injection hole EI formed on the exterior body 200. When the exterior sealing part ES1 of the exterior body 200 is formed, the electrolyte injection hole EI through which the electrolyte 300 is injected may be formed in advance by enabling some portions of the edge surfaces of the upper exterior layer 210 and the lower outer layer 220 not to be adhered.

In another embodiment, after the inner sealing part IS1 is formed, the electrolyte 300 may be injected into the inside of the exterior body 200 through the injection hole EI formed on the exterior body 200. When the exterior sealing part ES1 of the exterior body 200 is formed, the electrolyte injection hole EI through which the electrolyte 300 is injected may be formed in advance by enabling some portions of the edge surfaces of the upper exterior layer 210 and the lower outer layer 220 not to be adhered.

After the electrolyte 300 is injected, the electrolyte Injection hole EI may be sealed in order to prevent the leakage of the electrolyte 300. An electrolyte injection hole EI may be completely sealed by using a heat fusion method, an ultrasonic welding method, or other separate adhesives. In the example, the exterior body 200 including the exterior sealing part ES1 may be formed from the upper exterior layer 210 and the lower exterior layer 220. The exterior body 200 may accommodate and cover the electrode assembly 100. Further, the exterior body 200 may protect the electrode assembly 100 and the electrolyte 300 from the outside environment.

The electrode assembly 100, the exterior body 200 covering the electrode assembly 100, and the battery 1000 including the electrolyte 300 may be formed from these processes. According to the embodiment of the present invention, a battery 1000 may be installed on the inside part or the outside part of the electronic products via the battery penetration part TH2. In addition, the parts of the electronic products may be inserted into or projected from TH2.

In accordance with an embodiment of the invention, the inner penetration part TH1 is formed, and a battery penetration part TH2 including the penetration part TH1 from the exterior body 200 for accommodating the electrode assembly 100 therein is formed on an electrode assembly 100 consisting of the anode layer, the cathode layer, and the separation film. Thus, a battery or a battery cell may be provided wherein the battery penetration part TH2 passing through from the upper exterior layer 210 to the lower portion 220 is formed. Since the electronic component are inserted and mounted on a printed circuit board via the battery penetration part TH2 and the battery may be stacked to be mounted, so the need for the additional battery receiving space is reduced. As a result of it, it is possible to realize various kinds of shapes and sizes of the lithium secondary battery and to increase the capacity of the secondary battery itself, while enabling the electronic products to be miniaturized.

In addition, when the internal pressure of the secondary battery is increased, the phenomenon that the central portion of the battery is swelling much more than the rims of the battery is occurring. This swelling phenomenon of the central portion of the battery may be prevented by the battery penetrating part TH2 formed in the battery 1000 according to the present invention.

In addition, the battery penetration part TH2 may prevent the problem that the electrode assembly 100 is moving inside the exterior body 200. Thus, the problem that the electrode assembly 100 is damaged due to movement of the electrode assembly 100 or internal short circuit takes place due to contacts between the plates of other polarities of the other electrode assembly 100 may be prevented.

FIG. 7A-7G are cross-sectional diagrams illustrating a method of manufacturing a secondary battery according to another embodiment of the present invention.

Figure 7A:
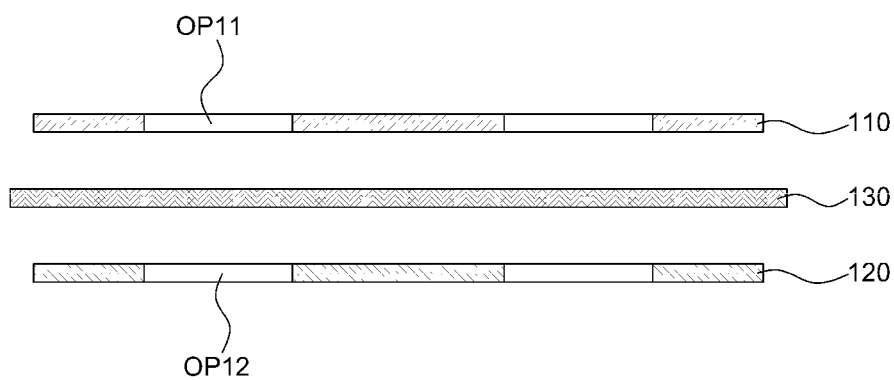
FIG. 7A to 7G are the cross-sectional diagrams illustrating a method of manufacturing a secondary battery according to another embodiment of the present invention

Referring to FIG. 7A, first of all, the electrode assembly 100 is formed. The cathode layer 110, the anode layer 120 and the separation film 130 disposed between the cathode layer 110 and the anode layer 120 are prepared in order to form the electrode assembly 100. The cathode layer 110 may include at least more than one the first openings OP11 formed on a region. According to one embodiment of the present invention, the first openings OP11 may be formed on the cathode layer 110 of a plate shape using a punching equipment. The punching equipment P may include an end of a pin shape capable of passing through the surface of the cathode layer 110. For example, a drill, an iron or a hollow pipe may be used as the punching equipment.

The anode layer 120 may include at least more than one the second openings OP12 on one region. According to one embodiment of the present invention, the second openings OP12 may be formed on the anode layer 120 of a plate shape using a punching machine. The punching equipment P may include an end of a pin shape capable of passing through the surface of the anode layer 120. For example, a drill, an iron or a hollow pipe may be used as a punching equipment.

The separation film 130 may be disposed between the cathode layer 110 and anode layer 120. The separation film 130 may have a plate shape. According to one embodiment of the present invention, in connection with the separation film 130, at least more than one openings may be formed after forming the electrode assembly 100 so that the first penetration part TH1 and the second penetration part TH2 described later may be formed. According to one embodiment of the present invention, the separation film 130 may be parallel to the cathode layer 110 and anode layer 120. In addition, a porous separator may be further formed in addition to a separation film 130 between the cathode layer 110 and the anode layer 120.

According to one embodiment of the present invention, the length of the separation film 130 formed in one direction may be longer than the lengths of the cathode layer 110 and the anode layer 120 formed in one direction. If the length of the separation film 130 is formed shorter than those of the cathode layer 110 and the anode layer 120, the separation film 130 may not perform sufficiently efficient movement of ions passing between the cathode layer 110 and the anode layer 120, and thus, a short circuit may occur between the cathode layer 110 and the anode layer 120.

According to one embodiment of the present invention, a positive lead tab (not shown) and a negative lead tab (not shown) may be adhered to the cathode layer 110 and the anode layer 120 of the electrode assembly 100 by a laser welding, an ultrasonic welding, a resistance welding or a conductive adhesive so that the currents may flow swimmingly. The positive electrode lead tab or the negative electrode lead tab may be formed so as to protrude from the electrode assembly 100 toward the direction vertical to the direction in which the electrode assembly 100 is wound.

Figure 7B:
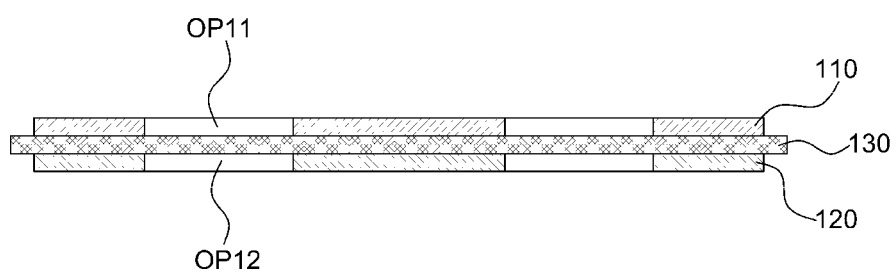

Referring to FIG. 7B, the anode layer 120, the separation film 130 and the cathode layer 110 may be laminated according to the sequential order as described above. According to one embodiment of the present invention, the anode layer 120, the separation film 130 and the cathode layer 110 may be aligned in one direction and be stacked according to the above stacked order. The separation film 130 may be disposed between the first openings OP11 of the cathode layer 110 and the second openings OP12 of the anode layer 120.

Figure 7C:
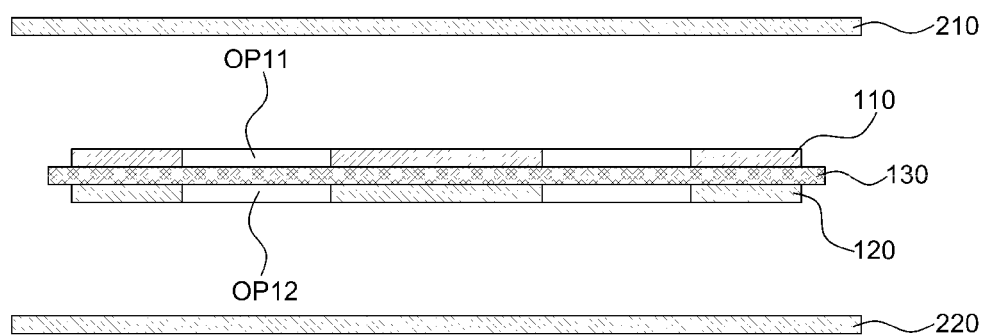
Figure 7D:
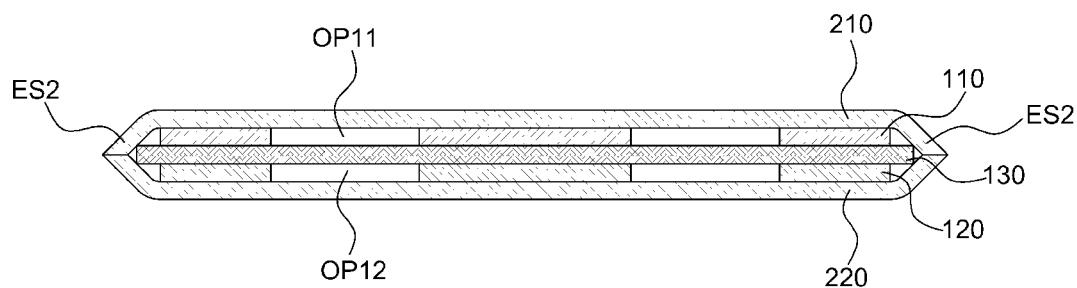
Figure 7E:
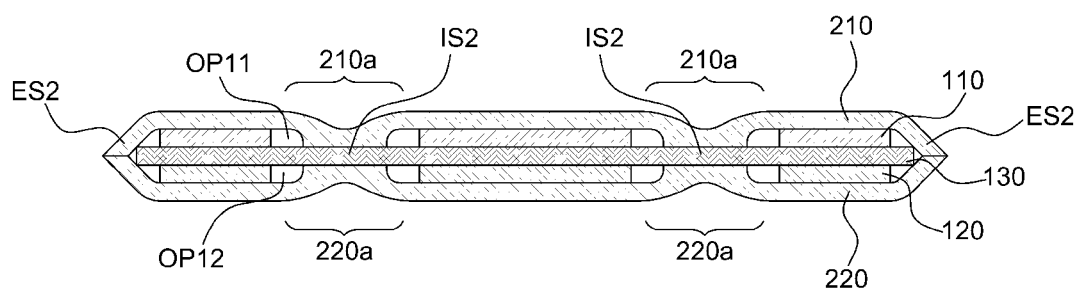

Referring to FIG. 7C, an exterior body 200 may be formed to accommodate the electrode assembly 100 and electrolyte 300. The upper exterior layer 210 and the lower exterior layer 220 of a plate shape prepared may be prepared in order to form an exterior member 200. Referring to FIG. 7D, an exterior sealing part ES2 may be formed via a step for attaching the upper exterior layer 210 and the lower exterior layer 220 to one side of the electrode assembly 100, and a step for sealing the edge zone of the upper exterior layer 210 and the lower exterior layer 220. The portion where the edge surfaces of the upper exterior layer 210 and the lower exterior layer 220 are adhered to each other may be the exterior sealing part ES2 at the edges of the upper exterior layer 210 and the lower exterior layer 220. The exterior sealing part ES2 may cover the lateral sides of the cathode layer 110, the anode layer 120 and the separation film 130 of the electrode assembly 100. According to one embodiment of the present invention, the exterior sealing part ES2 may be formed by compressing the edges of the upper exterior layer 210 and the lower exterior layer 220 by using a pressing equipment. Further, the exterior sealing part ES2 may be formed by attaching the edges of the upper exterior layer 210 and the lower exterior layer 220 by a heat fusion, an ultrasonic welding or an adhesive.

Referring to FIG. 2 and FIG. 7 together, the exterior sealing part ES2 may be formed by adhering some portions of the respective edge surfaces of an upper exterior layer 210 and the lower exterior layer 220*a*. At this time, an electrolyte injection hole EI through which electrolyte 300 is to be injected may be further formed along the respective edge portions of an upper exterior layer 210 and the lower exterior layer 220. Referring to FIG. 7E, it is possible to form an inner sealing part IS2 by adhering the respective opposite parts of the upper exterior layer 210 and the lower exterior layer 220 of the exterior body 200. The inner sealing part IS2 may be the part where a portion 210*a* of the upper exterior layer 210 and a portion 220*a* of the lower exterior layer 220, at which the inner penetration part TH2 illustrated in FIG. 7G is to be formed, are mutually adhered. According to one embodiment of the present invention, the inner sealing part IS2 may be formed by mutually compressing the portion 210*a* of the upper exterior layer 210 corresponding to a region where the inner penetration part TH2 is to be formed, the portion 220*a* of the lower exterior layer 220 corresponding to a region where the inner penetration part TH2 is to be formed, and a portion of the separation film 130 corresponding to a region where the inner penetration part TH2 is to be formed, via a pressing equipment. Further, the inner sealing part IS2 may be formed by mutually compressing the portion 210*a* of the upper exterior layer 210 corresponding to a region where the inner penetration part TH2 is to be formed, the portion 220a of the lower exterior layer 220 corresponding to a region where the inner penetration part TH2 is to be formed, and a portion of the separation film 130 corresponding to a region where the inner penetration part TH2 is to be formed, via a heat fusion, an ultrasonic welding or an adhesive.

Figure 7F:
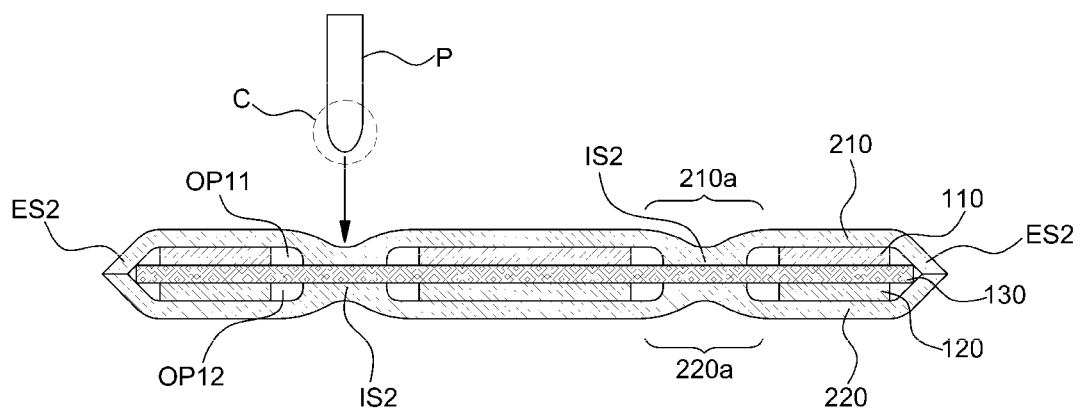
Figure 7G:
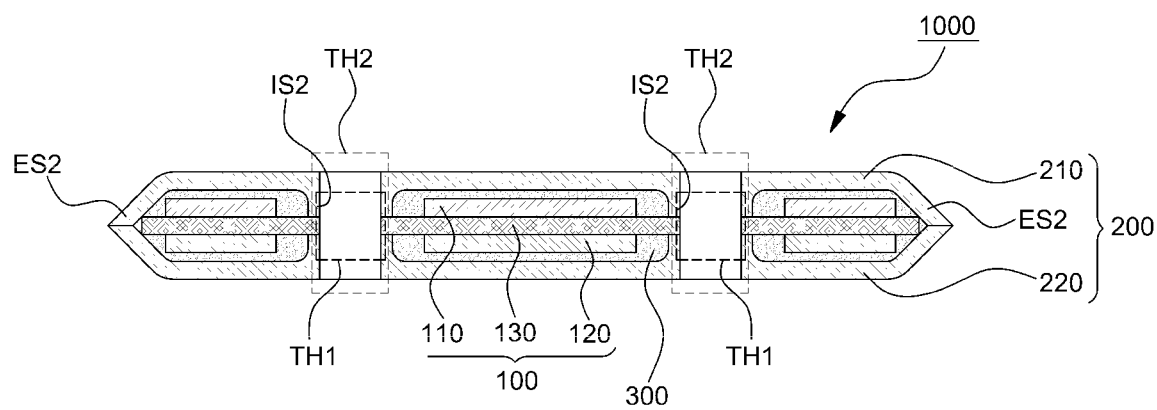

Referring to FIG. 7F, a punching equipment P may pass through the portion 210a of the upper exterior layer 210 corresponding to a region where the inner sealing part IS2 is to be formed, a portion of the separation film 130 corresponding to a region where the inner penetration part TH2 is to be formed, and the portion 220a of the lower exterior layer 220 corresponding to a region where the inner sealing part IS2 is to be formed. According to one embodiment of the present invention, the moving direction of the punching equipment P passing through the portion 210a of the upper exterior layer 210, a portion of the separation film 130 corresponding to a region where the inner penetration part TH2 is to be formed, and the portion 220a of the lower exterior layer 220 may be represented by an arrow in FIG. 7F. The punching equipment P may include a punching part C which may pass through the portion 210a of the upper exterior layer 210 corresponding to a region where the inner sealing part IS2 is formed, a portion of the separation film 130 corresponding to a region where the inner sealing part IS2 is to be formed, and the portion 220a of the lower exterior layer 220 corresponding to a region where the inner sealing part IS2 is formed in a sequential order as above. The punching portion C of the punching equipment P may include an end of a sharp pin shape. For example, a drill, an iron or a hollow pipe may be used as the punching equipment.

In one embodiment, it is possible to make the punching part C pass through the portion 210a of the upper exterior layer 210 corresponding to the area of the inner sealing part IS2, a portion of the separation film 130 corresponding to a region where the inner sealing part IS2 is formed, and the portion 220a of the lower exterior layer 220 in a sequential order as above. Referring FIG. 2 and FIG. 6G together, the punching equipment P may pass through the upper exterior layer 210 corresponding to a region where the inner sealing part IS2 is formed, the separation film 130 and the lower exterior layer 220. Thus, the battery penetration part TH2 including at least more than one inner penetration part TH1 may be formed. The inner penetration part TH1 may be an opening passing through the cathode layer 110, and the anode layer 120 and the separation film 130 between the cathode layer 110 and anode layer 120, under a state that the cathode layer 110, and the anode layer 120 and the separation film 130 between the cathode layer 110 and anode layer 120 are being aligned in one direction.

The battery penetration part TH2 may be an opening passing through the upper exterior layer 210, the cathode layer 110, and the anode layer 120, the separation film 130 between the cathode layer 110 and anode layer 120, and the lower exterior layer 220, under a state that the upper exterior layer 210, the cathode layer 110, the anode layer 120, the separation film 130 between the cathode layer 110 and anode layer 120, and the lower exterior layer 220 are being aligned in one direction. According to one embodiment of the present invention, inner the inner penetration part TH1 and a battery and the battery penetration part TH2 may be a shape such as a circle, a triangle, a quadrangle, an elliptical type. However, these shapes are not intended to be only illustrative of the present invention and it is not limited thereto. Since the battery penetration part TH2 passing through the portion 210a of the upper exterior layer, the separation film 130 and the lower exterior layer is formed, the respective surfaces of the upper exterior layer 210, the separation film 130 and the lower exterior layer 220 may be adhered to each other. According to one embodiment of the present invention, the shape of the battery penetration part TH2 including the inner penetration part TH1 may be changed in accordance with the shape of the punching portion C of the punching device P. The listed shapes according to the present invention are only illustrative and the present invention is not limited to them.

According to one embodiment of the present invention, the width of the battery penetration part TH2 be formed smaller than those of the first openings OP11 of the cathode layer 110 and the second openings OP12 of the anode layer 120. If the width of the battery penetration part TH2 may be formed larger than those of the first openings OP11 of the cathode layer 110 and the second openings OP12 of the anode layer 120, the internal short-circuit of the cathode layer and the anode layer may occur. Therefore, it is preferable that the width of the battery penetration part TH2 is smaller than those of the first openings OP11 of the cathode layer 110 and the second openings OP12 of the anode layer 120.

According to one embodiment of the present invention, after the inner sealing part IS2 is formed, the electrolyte 300 may be injected to the inside the exterior member 200 through the electrolyte injection hole EI formed on the exterior body 200. When the exterior sealing part ES2 of the exterior body 200, the electrolyte injection hole EI through which the electrolyte 300 is injected may be formed in advance by enabling some portions of the edge surfaces of the upper exterior layer 210 and the lower outer layer 220 not to be adhered.

In another embodiment according to the present invention, after the battery penetration part TH2, the electrolyte 300 may be injected into the inside of the exterior body 200 through the injection hole EI formed on the exterior body 200. When the exterior sealing part ES2 of the exterior body 200 is formed, the electrolyte injection hole EI through which the electrolyte 300 is injected may be formed in advance by enabling some portions of the edge surfaces of the upper exterior layer 210 and the lower outer layer 220 not to be adhered.

After the electrolyte 300 is injected, the electrolyte Injection hole EI may be sealed in order to prevent the leakage of the electrolyte 300. An electrolyte injection hole EI may be completely sealed by using a heat fusion method, an ultrasonic welding method, or other separate adhesives.

According to one embodiment of the present invention, the exterior body 200 including the exterior sealing part ES2 and the inner sealing part IS2 may be formed from the upper exterior layer 210, the separation film 130 and the lower exterior layer 220. The exterior body 200 may accommodate and cover the electrode assembly 100. Further, the exterior body 200 may protect the electrode assembly 100 and the electrolyte 300 from the outside environment.

The electrode assembly 100, the exterior body 200 covering the electrode assembly 100, and the battery 1000 including the electrolyte 300 may be formed from these processes. According to the embodiment of the present invention, a battery 1000 may be installed on the inside part or the outside part of the electronic products via the battery penetration part TH2. In addition, the parts of the electronic products may be inserted into or projected from TH2.

In accordance with an embodiment of the invention, a battery penetration part TH2 including the penetration part TH1 is formed. Thus, a battery or a battery cell may be provided wherein the battery penetration part TH2 passing through from the upper exterior layer 210 to the lower portion 220 is formed. Since the electronic component mounted on a printed circuit board are inserted and arranged via the battery penetration part TH2 and thus, the battery may be stacked to be mounted on a printed circuit board, so the need for the additional battery receiving space is reduced. As a result of it, it is possible to realize various kinds of shapes and sizes of the lithium secondary battery and to increase the capacity of the secondary battery itself, while enabling the electronic products to be miniaturized.

In addition, when the internal pressure of the secondary battery is increased, the phenomenon that the central portion of the battery swells much more than the rims of the battery is occurring. This swelling phenomenon of the central portion of the battery may be prevented by the battery penetrating part TH2 formed in the battery 1000 according to the present invention.

In addition, the battery penetration part TH2 in the battery 1000 may prevent the problem that the electrode assembly 100 is moving inside the exterior body 200. Thus, the problem that the electrode assembly 100 is seriously damaged due to movement of the electrode assembly 100 or internal short circuit takes place due to contacts between the plates of other polarities of the other electrode assembly 100 may be prevented.

The present invention as described above is not limited to the above-mentioned embodiments and the accompanying drawings, and it will be apparent to those skilled in the art to which the present invention belongs that various replacements, changes and modifications may be made within the scope that do not depart from the invention set forth in the claims described as below.

The invention claimed is:

1. A battery comprising,
an electrode assembly including a cathode layer and an anode layer facing the cathode layer and a separation film disposed between the cathode layer and the anode layer, and wherein the cathode layer, the anode layer, and the separation film include more than one aligned inner penetration parts;
an exterior body including a upper exterior layer and a lower exterior layer, and having an exterior sealing part in which facing portions of at least a portion of or whole edges are sealed so as to accommodate the electrode assembly and an electrolyte therein;
a battery penetration part forming openings from the upper exterior layer to the lower exterior layer by enabling the upper exterior layer and the lower exterior layer to be aligned in the inner penetration part; and
an inner sealing part in which facing portions of the upper exterior layer and the lower exterior layer of external periphery of the battery penetration part are sealed with the separation film being disposed between the upper exterior layer and the lower exterior layer,
wherein in an outer circumference of the battery penetration part, an end portion of the upper exterior layer directly contacts a upper surface of the separation film and an end portion of the lower exterior layer directly contacts a lower surface of the separation film, and
wherein a portion of the separation film between the upper surface and the lower surface is exposed to an inner side of the battery penetration part so that the portion of the separation film is in contact with the battery penetration part.

2. The battery of claim 1, wherein at least one of the cathode layer or the anode layer includes a current collector and an active material layer coated on the current collector.

3. The battery of claim 1, wherein at least one of the cathode layer or the anode layer includes a current collector including conductive fabrics connected to each other like a nonwoven fabric structure and an active material embedded in the current collector.

4. The battery of claim 1, wherein the exterior sealing part and the inner sealing part of the upper exterior layer and the lower exterior layer are adhered each other by a heat fusion.

5. The battery of claim 1, wherein the width of the opening of the separator among the individual openings defining the inner penetration part is smaller than the widths of the openings of the cathode layer and the anode layer.

6. The battery of claim 1, wherein the width of the opening of the separator among the individual openings defining the inner penetration part is equal to the width of the opening of the battery penetration part.

7. The battery of claim 1, wherein the inner penetration part and the battery penetration part have the same shape.

8. The battery of claim 1, wherein the battery is laminated on a mounting surface where at least more than one electronic components are mounted on a printed circuit board, and at least more than one electronic components are inserted into the battery penetration part or protruded through the battery penetration part, so that the battery and the printed circuit board may be assembled.

9. A battery comprising,
an electrode assembly including a cathode layer and an anode layer facing the cathode layer and a separation film disposed between the cathode layer and the anode layer;
an exterior body including a upper exterior layer and a lower exterior layer, and having an exterior sealing part in which facing portions of at least a portion of or whole edges are sealed so as to accommodate the electrode assembly and an electrolyte therein;
a battery penetration part forming openings from the upper exterior layer to the lower exterior layer; and
an inner sealing part in which facing portions of the upper exterior layer and the lower exterior layer of external periphery of the battery penetration part are sealed with the separation film being disposed between the upper exterior layer and the lower exterior layer,
wherein in an outer circumference of the battery penetration part, an end portion of the upper exterior layer directly contacts a upper surface of the separation film and an end portion of the lower exterior layer directly contacts a lower surface of the separation film,
wherein a portion of the separation film between the upper surface and the lower surface is exposed to an inner side of the battery penetration part so that the portion of the separation film is in contact with the battery penetration part, and
wherein the battery penetration part is configured to accommodate an electronic component therethrough on a printed circuit board.

10. The battery of claim 9, wherein at least one of the cathode layer or the anode layer includes a current collector and an active material layer coated on the current collector.

11. The battery of claim 9, wherein at least one of the cathode layer or the anode layer includes a current collector including conductive fabrics connected to each other like a nonwoven fabric structure and an active material embedded in the current collector.

12. The battery of claim 9, wherein the exterior sealing part and the inner sealing part of the upper exterior layer and the lower exterior layer are adhered each other by a heat fusion.

13. The battery of claim 9, wherein the cathode layer, the anode layer, and the separation film include more than one aligned inner penetration parts, wherein the width of the opening of the separator among the individual openings defining the inner penetration part is smaller than the widths of the openings of the cathode layer and the anode layer.

14. The battery of claim 9, wherein the cathode layer, the anode layer, and the separation film include more than one aligned inner penetration parts, wherein the width of the opening of the separator among the individual openings defining the inner penetration part is equal to the width of the opening of the battery penetration part.

15. The battery of claim 9, wherein the cathode layer, the anode layer, and the separation film include more than one aligned inner penetration parts, wherein the inner penetration part and the battery penetration part have the same shape.

16. The battery of claim 9, wherein a plurality of the battery penetration parts are provided in the battery, and at least two of the plurality of battery penetration parts have different shapes.

* * * * *